United States Patent Office 3,539,583
Patented Nov. 10, 1970

3,539,583
FLUORESCENT CATIONIC 2-IMINO-COUMARIN DYESTUFFS
Jacques Voltz, Riehen, Tibor Somlo, Birsfelden, Basel-Land, and Heinrich Hausermann, Riehen, Switzerland, assignors to J. R. Geigy A.G., Basel, Switzerland
No Drawing. Filed Feb. 14, 1967, Ser. No. 615,911
Claims priority, application Switzerland, July 22, 1966, 10,631/66
Int. Cl. C07d 31/42, 49/38, 91/44
U.S. Cl. 260—299               3 Claims

ABSTRACT OF THE DISCLOSURE

Fluorescent cationic 2-imino-coumarin derivatives substituted in 7-position by an optionally organically substituted amino group, which derivatives are dyestuff for dyeing acrylic fibre materials. On such material the dyestuffs produce fluorescent greenish yellow, yellow, reddish yellow and orange dyeings which are light-fast and also wet-fast such as fast to washing and, particularly, decatising.

---

The present invention concerns new fluorescent cationic dyestuffs, a process for the production thereof, their use for the dyeing of polymeric and copolymeric acrylonitrile material as well as, as industrial product, the polymeric and copolymeric acrylonitrile material dyed with these dyestuffs.

It has been found that valuable fluorescent cationic dyestuffs of Formula I

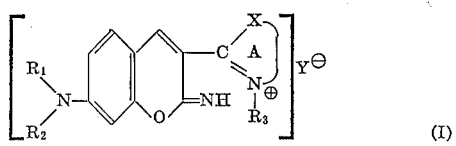

(I)

wherein X represents a divalent radical which makes up the nitrogen-containing ring A into a five or six membered ring,
$R_1$ and $R_2$ each represent hydrogen, an optionally substituted alkyl group, a cycloalkyl group or an aryl group, or
$R_1$ and $R_2$ together with the nitrogen atom, with the optional inclusion of a further hetero atom, form a hetero ring,
$R_3$ represents an unsubstituted or non-ionogenically substituted alkyl radical and
$Y^-$ represents the anion of a strong inorganic or organic acid,
are obtained when a dyestuff of Formula II

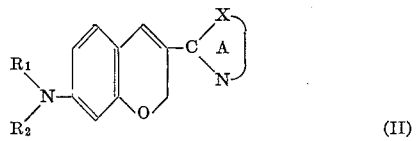

(II)

wherein X, A, $R_1$ and $R_2$ have the meanings given in Formula I, is reacted with the reactive ester of an unsubstituted or nonionogenically substituted alkanol with a strong inorganic or organic acid, to form a cyclammonium compound of Formula I.

In Formula I, the nitrogen-containing ring A is, as defined, a five or six membered ring, i.e. either an azolium or an azinium ring which, optionally, is condensed with carbocyclic-aromatic rings, e.g. with a naphthalene ring or, preferably, with a benzene ring.

If the nitrogen-containing heterocycle A is an azolium ring, then the divalent radical X making up this ring according to the above Formula I represents, e.g. the vinyl amino radical —CH=CH—NH—, the vinylthio radical —CH=CH—S—, the vinyloxy radical —CH=CH—O— or the radicals —CH=N—NH—, —N=CH—O—, —N=CH—S—. When it has these meanings, X makes up a pyrazolium or imidazolium, thiazolium, oxazolium, 1,2,4-triazolium, 1,3,4-oxidazolium or 1,3,4-thiadiazolium ring. If X, for example, represents a divalent o-phenylimino

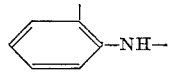

o-phenylthio

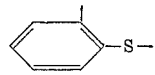

or o-phenoxy radical

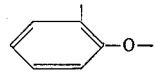

the hetero ring A is thus a benzimidazolium, benzthiazolium or benzoxazolium ring.

If the nitrogen-containing heterocycle A is an azinium ring, then the divalent radical X forming part thereof according to Formula I above represents, e.g. the butadienylene radical —CH=CH—CH=CH—, the styrylene radical

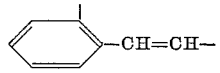

bound in o-position to the vinylene group, or the propenylimino radical —CH=CH—CH=N—. In these meanings, X form part of a pyridinium, quinolinium or pyrimidinium ring bound in 3-position to the coumarin imide radical.

The carbocyclic-aromatic rings fused to the nitrogen-containing ring A, particularly the benzene ring, can be further substituted. Inert atoms and groups can be ring substituents, e.g. halogen atoms such as chlorine or bromine, low unsubstituted alkyl groups or alkyl groups substituted by hydroxyl groups, low alkoxy groups or by halogens such as fluorine, chlorine or bromine, also low alkoxy groups such as methoxy or ethoxy groups; carbacyl groups particularly low alkanoyl groups such as the acetyl group; low alkylsulphonyl groups such as the methylsulphonyl or ethylsulphonyl group; sulphonic acid aryl ester groups such as the sulphonic acid phenyl ester group; carboxylic acid ester groups, particularly low carbalkoxy groups such as the carbomethoxy or carbenthoxy group or the carbophenoxy group; the carbamoyl or sulphamoyl group or N-mono- or N,N-disubstituted carbamoyl or sulphamoyl groups, particularly N-alkyl- or N,N-dialkyl-sulphamoyl groups; acylamino groups, e.g. low alkanoylamino groups such as the acetylamino group, or alkylsulphonylamino groups such as the methylsulphonylamino group.

In preferred dyestuffs of Formula I, X is a divalent radical which makes up the nitrogen-containing ring A into an azolium ring condensed with carbocyclic-aromatic rings, particularly into a benzazolium ring.

In particularly easily accessible dyestuffs of the above Formula I, X represents a divalent o-phenylimino radical, i.e. X makes up the nitrogen-containing ring A into a benzimidazolium ring. This ring is bound in the 3-position to the coumarin imide radical and, as described above, can be further substituted.

If the nitrogen substituents $R_1$ and $R_2$ in the cationic coumarin imide dyestuffs of Formula I usable according to the invention represent an alkyl radical then this preferably has 1 to 6 carbon atoms. If this alkyl radical is substituted then substituents can be, e.g. halogens such as chlorine or bromine, the cyano group, the hydroxyl group, ether groups particularly low alkoxy groups, acyloxy groups, preferably low alkanoyloxy groups, carboxylic acid ester groups, carboxylic acid amide groups or aryl groups, particularly the phenyl group. Examples of such substituted alkyl radicals, are the β-chlorethyl or β-bromoethyl, β-cyanoethyl, β-hydroxyethyl, β- or γ-hydroxypropyl, β,γ-dihydroxypropyl, β-methoxyethyl or β-ethoxyethyl, γ-methoxypropyl or γ-ethoxypropyl, β-acetoxyethyl or β-propionyloxyethyl, carbomethoxymethyl, carbethoxymethyl or benzyl group. If $R_1$ and $R_2$ represent a cycloalkyl group then this is chiefly the cyclohexyl group. If $R_1$ and $R_2$ are aryl groups, then these are carbocyclic and, advantageously, mononuclear.

When $R_1$ and $R_2$ together with the nitrogen atom form a hetero ring, this is, e.g. the piperidine ring and, should this ring include another hetero atom, e.g. the morpholine ring.

Preferably $R_1$ and $R_2$ are identical and represent a low alkyl group, particularly the methyl or ethyl group.

When $R_3$ is an unsubstituted alkyl radical, this has 1 to 4 carbon atoms preferably in a straight chain. Nonionogenic groups can be substituents of this alkyl radical such as the cyano group, the carbamoyl group or a carbalkoxy group such as the carbomethoxy or carbethoxy group, or a phenyl group. Phenyl-substituted alkyl groups are preferably the benzyl radical.

In preferred cationic dyestuffs of Formula I, however, $R_3$ represents the methyl or ethyl group.

As anion of a strong inorganic acid, $Y^\ominus$ is, e.g. the chlorine, bromine, iodine or sulphate ion or the anion of a metal hydrohalic acid, e.g. the trichloro-zinc cation. As anion of a strong organic acid, $Y^\ominus$ is, e.g. an alkoxy sulphate ion, an aryl sulphonate ion, such as the benzene or p-toluene sulphonate ion, or also the oxalate ion.

The greater part of starting materials of Formula II are known or can be produced in a known way, for example by the method described in German Pat. No. 1,098,125, by aldole condensation of a 2-hydroxy-4-amino-benzaldehyde of Formula III

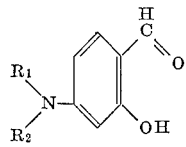

(III)

with a cyanomethyl compound of Formula IV

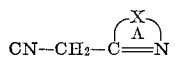

(IV)

and subsequent closure of the coumarin ring.

In Formulae III and IV, $R_1$, $R_2$, X and A have the meanings given in Formula I.

Examples of suitable starting materials are: 3-(benzimidazol-2'-yl)-7-amino-coumarin imide, -7-monoethylamino-coumarin imide, -7-phenylamino-coumarin imide, -7-cyclohexylamino - coumarin imide, -7-dimethylamino-coumarin imide, -7-diethylamino-coumarin imide, -7-dibutylamino-coumarin imide, -7-dicyanoethylamino-coumarin imide, -7-N-hydroxyethyl-N-ethylamino-coumarin imide, -7-N-methoxyethyl-N-ethylamino-coumarin imide, -7-N-cyanoethyl-N-methylamino-coumarin imide, -7-N-benzyl-N-methylamino-coumarin imide, -7-morpholino-coumarin imide; 3(1'-methyl-, or 3'-ethyl-, 3'-cyanoethyl-, 3' - carbamoylethylbenzimidazol - 2' - yl) - 7 - diethylamino-coumarin imide; 3-(3'-ethoxycarbonylmethyl- or 3' - benzyl - benzimidazol - 2' - yl) - 7 - dimethylamino-coumarin imide; 3-(5'-chloro-, or 5'-methyl-, 5'-methyl-sulphonyl-benzimidazol-2'-yl)-7-diethylamino - coumarin imide; 3 - (naphthimidazol - 2' - yl)-7-dimethyl-coumarin imide; 3-(6'-chlorobenzthiazol-2'-yl) - 7 - dimethylamino-coumarin imide; 3-(benzthiazol - 2' - yl)-7-diethylamino-coumarin imide; 3 - (6' - methoxybenzthiazol-2'-yl)-7-diethylamino-coumarin imide; 3-(benzthiazol - 2' - yl)-7-N-ethyl-N-cyanoethyl-amino-coumarin imide; 3-(naphthiazol-2'-yl)-7-N-oxethyl-N-ethylamino-coumarin imide; 3-(pyridin-2'-yl) - 7 - dimethylamino-coumarin imide or 3-(quinolin-2'-yl)-7-dimethylamino-coumarin imide.

As reactive alkanol esters which are reacted with the dyestuffs of Formula II to form cyclammonium compounds of Formula I are used, chiefly, the methyl, ethyl, n-propyl, n-butyl, cyanoethyl, benzyl esters of hydrogen chloride, hydrogen bromide, hydrogen iodide, dimethyl and diethyl sulphates, the methyl and ethyl esters of benzene or p-toluene sulphonic acid, also the bromoacetic acid alkyl esters (having an alkyl radical of, preferably, 1 to 4 carbon atoms).

Instead of certain substituted alkanol esters, also precursers thereof can be used, e.g. instead of β-cyanoethyl chloride or bromide or β-carbamoyl ethyl chloride or bromide, acrylonitrile or acrylamide in the presence of concentrated hydrochloric or hydrobromic acid.

The reaction of a dyestuff of Formula II with a reactive alkanol ester to form the cyclammonium compound of Formula I is performed by heating the two substances, preferably at a temperature of 80–150° C., optionally in the presence of acid binding agents such as magnesium oxide, calcium carbonate or sodium acetate, advantageously in an organic solvent not taking part in the reaction.

Suitable solvents are, e.g. optionally halogenated or nitrated aromatic hydrocarbons such as toluene, xylene, halogen benzenes or nitrobenzenes, or optionally halogenated aliphatic hydrocarbons, e.g. trichloroethylene or trichloroethane.

The new cyclammonium compounds of Formula I are in the form of salts of the acids of the alkanol or aralkanol esters as defined which are used for their production, i.e. as colour salts of strong inorganic or organic acids. These are chiefly chlorides, bromides, iodides, methosulphates, ethosulphates, bisulphates, benzene sulphonates or p-toluene sulphonates. If desired, also salts of other acids can be produced by double reaction, e.g. oxalates by the addition of oxalic acid. Double salts can also be produced, e.g. by reaction of the dyestuff halides with corresponding zinc or cadmium salts.

The new compounds of Formula I generally dissolve well in water, this particularly when they are in the form of salts of a strong inorganic acid or organic sulphonic acid. They can be used in a wide pH range (2–8) and, on heating in an open dybath or a closed one under pressure, they draw substantially to completely from an aqueous, neutral or from a weakly acid solution, optionally in the presence of wetting agents having a dispersing action such as in the presence of condensation products of alkylene oxides with higher alkanols, onto polymeric or copolymeric acrylonitrile fibre material. On this material they produce fluorescent greenish yellow, yellow, reddish yellow and orange dyeings which are light fast and also wet fast such as fast to washing and, particularly, decatising.

Compared with previously known dyestuffs of similar constitution, the basic dyestuffs according to the invention have the advantage that they are stable in the dyebath over a wide pH range (2–8) and, above all, that their fluorescence is not impaired even when dyeing is performed at pH values of between 6 and 8.

The following examples illustrate the invention. The temperatures are given therein in degrees centigrade.

EXAMPLE 1

A suspension of 5 g. of 3-(benzimidazol-2'-yl)-7-diethyl-amino-coumarin imide in 20 g. of dimethyl sulphate is heated for 10 minutes at 120°. The reaction mass is poured, while still hot, into 500 ml. of 60° warm water and the pH of the solution is adjusted to 4–5 by the addition of sodium acetate. The yellow colour salt is precipitated from the clarified solution in the form of the zinc chloride double salt with the aid of zinc and sodium chloride. It is filtered off, washed with aqueous sodium chloride solution and dried. The colour salt of the formula

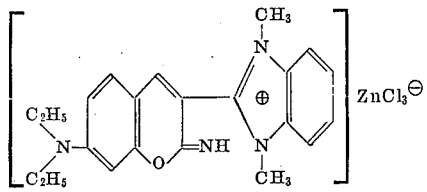

dissolves in water with an intensive green fluorescence and dyes polyacrylonitrile fibres from an acetic acid bath in vivid yellow shades of excellent purity and having excellent fastness properties.

The 3-(benzimidazol-2'-yl)- 7 -diethylamino-coumarin imide used is obtained by condensing benzimidazol-2-yl-acetonitrile with 4-diethylamino-2-hydroxy-benzaldehyde in dimethyl formamide in the presence of basic catalysts such as pyrrolidine or piperidine.

If instead of the 3-(benzimidazol-2'-yl)-7-diethylamino-coumarin imide, equivalent amounts of the 3-(benzimidazol-2'-yl)-7-amino-coumarin imide derivatives listed in the following Table I are used then, with otherwise the same procedure, basic colour salts having similar dyeing properties are obtained. They dye polyacrylonitrile fibres in the shades given in the last column of the Table I.

TABLE I

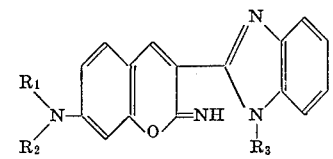

| | $R_1$ | $R_2$ | Shade on polyacrylonitrile fibres |
|---|---|---|---|
| Example: | | | |
| 2 | $CH_3$ | $CH_3$ | Greenish yellow. |
| 3 | $C_2H_4$ | H | Do. |
| 4 | $C_4H_9$ | $C_4H_9$ | Do. |
| 5 | H | H | Do. |
| 6 | $CH_2-C_6H_5$ | $CH_3$ | Do. |
| 7 | $C_2H_4CN$ | $CH_3$ | Do. |
| 8 | $C_2H_4OH$ | $C_2H_5$ | Do. |
| 9 | $C_2H_4OCH_3$ | $C_2H_5$ | Do. |
| 10 | $C_2H_4CN$ | $C_2H_4CN$ | Do. |
| 11 | Morpholino— | | Do. |
| 12 | $C_6H_{11}$ | H | Do. |
| 13 | $C_6H_5$ | H | Do. |

If equivalent amounts of p-toluene sulphonic acid methyl ester are used instead of dimethyl sulphate as alkylating agent, then the same colour salts are obtained.

EXAMPLE 14

A solution of 2.5 g. of dimethyl sulphate in 20 ml. of chlorobenzene is added to a 110° hot solution of 6.7 g. of 3-(1'-methyl - benzimidazol - 2' - yl-7-diethylamino-coumarin imide in 200 ml. of chlorobenzene. The reaction mixture is kept for 1 hour at 110–120° whereby the yellow colour salt being formed begins to precipitate. The reaction mixture is cooled to room temperature and then the precipitated basic dyestuff is filtered off. The colour cation formed is identical with that described in Example 1.

The 3 - (1' - methyl-benzimidazol-2'-yl)-7-diethylamino-coumarin imide used is produced by condensation of 1-methyl-benzimidazol - 2 - yl-acetonitrile with 4-diethylamino-2-hydroxybenzaldehyde in dimethyl sulphoxide in the presence of pyrrolidine.

Basic dyestuffs having similar dyeing properties are obtained by alkylating equivalent amounts of the 3-(3'-alkylbenzimidazol-2'-yl)-7-dialkylamino-coumarin imide compounds listed in the following Table II as described in the example.

The shades of the dyeings of the corresponding colour salts obtained on polyacrylonitrile fibres can be seen in the last column of Table II.

TABLE II

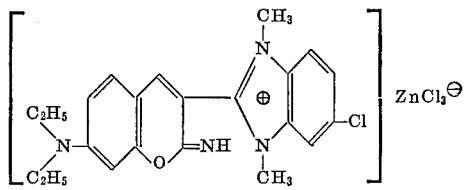

| | $R_1$ | $R_2$ | $R_3$ | Dyeing on polyacrylonitrile fibres |
|---|---|---|---|---|
| Example: | | | | |
| 15 | $C_2H_5$ | $C_2H_5$ | $C_2H_5$ | Greenish yellow. |
| 16 | $C_2H_5$ | $C_2H_5$ | $C_2H_5CN$ | Do. |
| 17 | $C_2H_5$ | $C_2H_5$ | $C_2H_4CONH_2$ | Do. |
| 18 | $CH_3$ | $CH_3$ | $CH_2COOC_2H_5$ | Do. |
| 19 | $CH_3$ | $CH_3$ | $CH_2-C_6H_5$ | Do. |

EXAMPLE 20

7.4 g. of 3-(5'-chlorobenzimidazol-2'-yl)-7-diethylamino-coumarin imide and 0.8 g. of magnesium oxide are suspended in 250 ml. of tetrachloroethane. The mixture is heated to 120°, a solution of 5 g. of dimethyl sulphate in 20 ml. of tetrachloroethane is added while stirring and the whole is kept for 1 hour at 120°. After adding 400 ml. of water to the cooled reaction mixture, the organic solvent is distilled off in vacuo. The basic dyestuff formed is precipitated from the clarified aqueous solution by salting out with zinc chloride and sodium chloride. It is isolated by filtration and dried.

The colour salt corresponds to the formula:

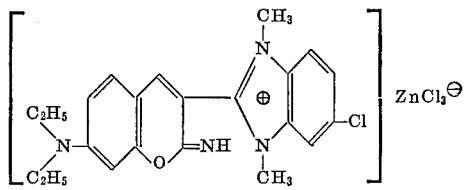

dissolves in water with a vivid yellow shade and dyes polyacrylonitrile fibres from an acetic acid bath in greenish yellow shades of excellent purity and having excellent wet fastness properties.

The starting material is obtained by condensation of 5-chlorobenzimidazol-2-yl acetonitrile with 4-diethylamino-2-hydroxy-benzaldehyde in dimethyl formamide in the presence of pyrrolidine.

Cationic dyestuffs having similar properties are obtained if, in the methylation described above, instead of 3-(5-chlorobenzimidazol-2'-yl) - 7 - diethylamino-coumarin imide, equivalent amounts of 3-(5'-methylbenzimidazol-2'-yl)-, 3-(5'-methylsulphonyl-benzimidazol-2'-yl)- or 3-(naphthimidazol-2'-yl)-7-dimethyl coumarin imide are used.

EXAMPLE 21

5 g. of 3-(6'-chlorobenzthiazol-2'-yl)-7-dimethylamino-coumarin imide are heated for 30 minutes at 120° in 25 g. of diethyl sulphate. The red-brown melt is extracted with 500 ml. of hot water, the solution is buffered with sodium acetate to a pH of 4–5 and then clarified while warm. The orange basic dyestuff formed is precipitated by the addition of zinc and sodium chloride.

The basic dyestuff corresponds to the formula

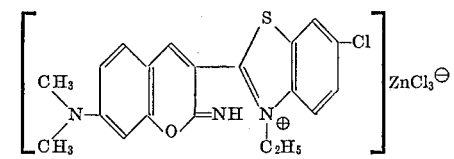

and dissolves easily in water with a vivid orange shade. It dyes fibres made of polyacrylonitrile from an acetic acid bath in red-orange shades of outstanding purity and having excellent wet fastness.

The starting material is obtained by condensation of 6-chlorobenzthiazol-2-yl acetonitrile with 4-dimethylamino-2-hydroxy-benzaldehyde in dimethyl formamide in the presence of pyrrolidine.

Dyestuffs having similar properties are obtained by keeping to the above reaction conditions when, as starting materials, equivalent amounts of 3-(benzthiazol-2'-yl)-7-diethylamino-coumarin imide, 3-(6'-methoxybenzthiazol-2'-yl)-7-diethylamino-coumarin imide, 3-(benzthiazol-2'-yl)-7-N-ethyl-N-cyanoethyl-amino-coumarin imide or 3-(naphthiazol-2'-yl) - 7 - N - oxethyl - N - ethylamino-coumarin imide are used instead of 3-(6'-chlorobenzthiazol-2'-yl)-7-dimethylamino-coumarin imide.

EXAMPLE 22

3-(pyridine-2'-yl)-7-dimethylamino-coumarin imide is alkylated by adding 2.5 g. of dimethyl sulphate to the solution of 5.3 g. of that compound in 200 ml. of chlorobenzene at 120° and keeping the reaction mixture for 30 minutes at that temperature. 500 ml. of water are then poured into the cooled reaction mixture and the organic solvent is removed in vacuo while continuously replacing the water distilled off. After clarification of the aqueous solution of the yellow dyestuff formed, the dyestuff is precipitated with zinc and sodium chloride in the form of the zinc chloride double salt. From an acetic acid bath this colour salt dyes polyacrylonitrile fibres in vivid yellow shades of outstanding purity.

It corresponds to the following formula:

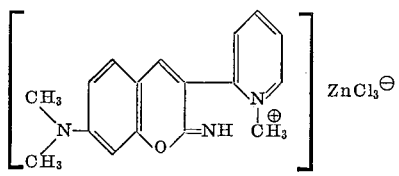

A similar, somewhat more reddish yellow colour salt is obtained starting from equivalent amounts of 3-(quinoline-2'-yl)-7-dimethylamino-courmarin imide and alkylating under the conditions described.

The starting materials mentioned are obtained by condensation of pyridine-2-yl acetonitrile or quinoline-2-yl acetonitrile with 4-dimethylamino - 2 - hydroxy-benzaldehyde in dimethyl formamide in the presence of catalytic amounts of pyrrolidine.

EXAMPLE 23

0.5 g. of the basic dyestuff obtained in Example 1 are slurried with 0.5 ml. of 80% acetic acid and then 4000 parts of warm water are added. 2 g. of sodium acetate, 1 ml. of 80% acetic acid and 4 g. of a condensation product of olefin alcohol and 15 mols of ethylene oxide are added to the solution obtained. 100 g. of polyacrylonitrile fibres are introduced at 50°, the temperature of the bath is raised to the boil within 15 minutes and dyeing is performed for 1 hour at the boil. The dyeliquor is, for all practical purposes, completely exhausted. The goods are then soaped for 15 minutes at 80° in 5000 ml. of water with the addition of 6 g. of the sodium salt of oleic acid-N-methyl-N-β-sulphonic acid ethyl amide, washed and dried. Polyacrylonitrile fibres dyed a vivid greenish yellow are obtained. The dyeing has outstanding fastness to washing.

We claim:
1. A compound of the formula

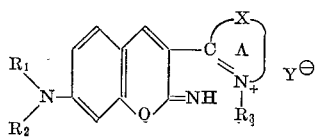

wherein X is a divalent radical selected from the group of

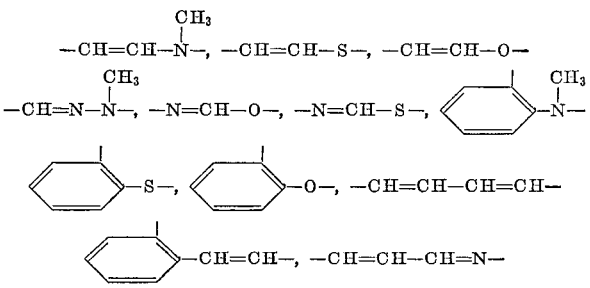

and such radicals wherein the benzene moiety present is substituted by a member of the group of halogen, lower alkyl, hydroxy lower alkyl, lower alkoxy lower alkyl, halo lower alkyl, lower alkoxy, lower alkanoyl, lower alkyl sulphonyl, sulphonic acid phenyl ester, lower carbalkoxy, carbamoyl, sulphamoyl, N-lower alkyl sulphamoyl, N,N-di lower alkyl sulphamoyl, lower alkanoylamino, and lower alkylsulphonylamino;

$R_1$ and $R_2$ each represent a member of the group of (a) alkyl of 1–6 carbon atoms, (b) such alkyl groups substituted by a member of the group of (1) halogen, (2) cyano, (3) hydroxy, (4) lower alkoxy, (5) lower alkanoyloxy, (6) carboxylic acid lower alkyl ester and (7) phenyl, (c) cyclohexyl, and (d) phenyl, or $R_1$ and $R_2$ together with the nitrogen atom to which they are attached form a heterocyclic ring from the group of piperidino and morpholino, $R_3$ represents a member from the group of alkyl of 1 to 4 carbon atoms or such alkyl substituted by a member from the group of cyano, carbamoyl, carboloweralkoxy and phenyl, and $Y^\ominus$ represents the anion of a strong inorganic or organic acid.

2. A compound according to claim 1 wherein X is

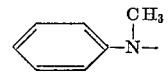

$R_1$ and $R_2$ are ethyl,
$R_3$ is methyl, and
$Y^\ominus$ is the anion of a metal hydrohalic acid.

3. A compound according to claim 1 said compound being

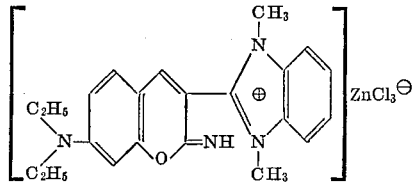

References Cited

UNITED STATES PATENTS 3,014,041  12/1961  Hausermann et al. ___ 260—304
3,299,079  1/1967  Taylor _____ 260—304 XR FLOYD D. HIGEL, Primary Examiner U.S. Cl. X.R.

8—4, 41, 42; 117—138.8; 260—41, 247.2, 256.4, 270, 288, 294.9, 296, 302, 304, 307, 308, 309, 309.2